United States Patent
Zou et al.

(10) Patent No.: US 8,687,304 B1
(45) Date of Patent: Apr. 1, 2014

(54) SENSOR-AIDED PATTERNED MAGNETIC MEDIA SYNCHRONIZATION SYSTEMS

(75) Inventors: Qiyue Zou, San Jose, CA (US); Xueshi Yang, Cupertino, CA (US); Gregory Burd, San Jose, CA (US)

(73) Assignee: Marvell International, Ltd., Hamilton (BM)

(*) Notice: Subject to any disclaimer, the term of this patent is extended or adjusted under 35 U.S.C. 154(b) by 436 days.

(21) Appl. No.: 13/007,787

(22) Filed: Jan. 17, 2011

Related U.S. Application Data

(60) Provisional application No. 61/295,931, filed on Jan. 18, 2010, provisional application No. 61/362,236, filed on Jul. 7, 2010.

(51) Int. Cl.
*G11B 5/09* (2006.01)

(52) U.S. Cl.
USPC .......................................................... 360/51

(58) Field of Classification Search
None
See application file for complete search history.

(56) References Cited

U.S. PATENT DOCUMENTS

| 6,643,082 | B1 | 11/2003 | Belser |
| 2010/0073801 | A1* | 3/2010 | Itakura .......................... 360/51 |
| 2010/0123973 | A1* | 5/2010 | Ozawa et al. .............. 360/77.08 |
| 2010/0202079 | A1* | 8/2010 | Buch et al. ...................... 360/51 |

OTHER PUBLICATIONS

"Density Multiplication and Improved Lithography by Directed Block Copolymer Assembly for Patterned Media at 1Tbit/in2 and Beyond"; Aug. 2008; pp. 1-3; Hitachi Global Storage Technologies; San Jose, CA.
U.S. Appl. No. 12/949,693, filed Nov. 18, 2010; First Named Inventor: Qiyue Zou.
U.S. Appl. No. 12/949,681, filed Nov. 18, 2010; First Named Inventor: Qiyue Zou.

* cited by examiner

*Primary Examiner* — Regina N Holder

(57) ABSTRACT

A write clock synchronization system includes a first module configured to generate a write clock signal. A second module is configured to, based on a sensor signal received, detect a pattern of bit islands on bit-patterned media. The second module is configured to determine a phase error of the write clock signal based on the pattern of the bit islands. A third module is configured to at least one of adjust or select a phase of the write clock signal based on the phase error.

17 Claims, 12 Drawing Sheets

SENSOR-AIDED PATTERNED MAGNETIC MEDIA SYNCHRONIZATION SYSTEMS

CROSS-REFERENCE TO RELATED APPLICATIONS

This application claims the benefit of U.S. Provisional Application No. 61/295,931, titled "SENSOR-AIDED DISK SYNCHRONOUS WRITE FOR PATTERNED MEDIA", filed on Jan. 18, 2010 and U.S. Provisional Application No. 61/362,236, titled "SENSOR-AIDED DISK SYNCHRONOUS WRITE FOR PATTERNED MEDIA", filed on Jul. 7, 2010. The disclosures of the above applications are incorporated herein by reference in their entirety.

FIELD

The present disclosure relates to magnetic recording systems for continuous media and bit-patterned media.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Continuous media recording systems write data to a disk that is coated by magnetic material in a continuous pattern. Prior to a write operation, servo sector information (e.g., preamble data, synchronization marks, and positioning information) is read from a disk. The servo sector information is used to position a read/write head and to correct head positioning error. Head positioning error may refer to a difference between (i) the true track/data bit position on a disk that data is stored (or is to be stored) and (ii) the read/write head position on the disk at which the data is to be read and/or written. Subsequent to correcting head positioning error, data is written to sectors of the disk at a desired position. Since data is written to the disk with continuous magnetic material pattern in a track, the data may be written generally at any point within a sector of the disk.

In continuous media, bits are stored in adjacent locations on a disk. Each bit is stored in multiple independent grains (nanometer-scale grains) in a film of magnetic alloy. The size of the grains may be reduced to increase bit density on a disk. The smaller the size of the grains, the more interference between the grains due to a superparamagnetic effect. The superparamagnetic effect refers to magnetization flipping of grains due to changes in, for example, temperature. The superparamagentic effect can negatively affect maintenance of data and thus limit storage density of a disk.

Bit-patterned media (BPM) recording systems provide increased storage capacity over continuous media recording systems. BPM recording systems may store as much as ten times more information on a magnetic storage device (e.g., a magnetic disk or hard disk) than continuous media recording systems. As an example, a BPM recording system may store 1 or more terabits (Tbit) of data in one square inch ($in^2$) of a magnetic disk.

BPM recording systems write data to a disk in discontinuous island-based patterns (uniform magnetic islands on the disk surface). Bits of data are stored at specific points or discrete bit islands on the disk. The bit islands are separated by grooves and/or non-magnetic material(s). For example, each bit island may store 1 bit of data. As each bit is stored on a designated bit island, thermal stability of BPM can be better than thermal stability of continuous media. Also, interference between bit islands of BPM is less than interference between grains in continuous media.

Bit-level head positioning accuracy requirements of BPM recording systems are more stringent than that of continuous media recording systems, as bit positions on BPM (or bit island locations) are predefined. Accurate bit-level head positioning ensures that data is written over correct bit islands areas of a disk while minimizing and/or avoiding attempts to write data over areas between bit islands (or to wrong bit islands).

A BPM recording system may include a write clock. The write clock may be used for timing write events including positioning and access timing of a write head. Synchronization of the write clock with the patterned media is needed in a BPM recording system due to the discontinuous format of BPM. A write clock signal is synchronized when rising and/or falling edges of the write clock signal are aligned with start and end positions of the bit islands, such that writing occurs over the bit islands and not over areas between bit islands. Loss in synchronization between the write clock signal and the bit islands can lead to errors, which may be difficult to detect and correct.

SUMMARY

A write clock synchronization system is provided and includes a first module configured to generate a write clock signal. A second module is configured to, based on a sensor signal received, detect a pattern of bit islands on bit-patterned media. The second module is configured to determine a phase error of the write clock signal based on the pattern of the bit islands. A third module is configured to at least one of adjust or select a phase of the write clock signal based on the phase error.

In other features, the write clock synchronization system further includes a synchronization sensor configured to generate the sensor signal. The synchronization sensor is one of an optical sensor and a magnetic sensor.

In other features, the second module is configured to determine the phase error based on a phase of the sensor signal and a predetermined phase shift value. In other features, the write clock synchronization system further includes a fourth module configured to generate the predetermined phase shift value based on a test write.

In other features, the third module includes a sixth module configured to at least one of adjust or select a phase of the write clock signal to generate an interpolated clock signal.

In other features, the write clock synchronization system further includes a write head configured to write data on a disk. The third module includes a fourth module configured to generate an interpolated clock signal based on the phase error and the write clock signal generated by the first module; The third module includes a fifth module configured to frequency convert the interpolated clock signal to a write clock output signal. The write head is configured to write the data on the disk based on the write clock output signal.

In other features, the write clock synchronization system further includes a phase lock loop comprising the second module and the third module. In other features, the third module is configured to generate an interpolated clock signal based on the phase error. The phase lock loop further includes a fourth module configured to adjust phase of the interpolated clock signal based on a calibrated phase shift value.

In other features, the second module determines timing information of the sensor signal. The third module synchronizes phase and frequency of the write clock signal with the sensor signal.

In other features, the second module includes a fourth module configured to filter the sensor signal to generate a filtered sensor signal. A fifth module is configured to convert the filtered sensor signal from an analog signal to a digital signal. A sixth module is configured to determine the phase error based on the digital signal. The third module includes a seventh module configured to generate an interpolated clock signal based on the phase error and the write clock signal generated by the first module.

In other features, the third module includes a fourth module configured to generate an equalized signal based on a digital version of the sensor signal. A fifth module is configured to generate a bit sequence based on the equalized signal. A sixth module is configured to generate a reconstructed signal based on the bit sequence. A seventh module is configured to determine the phase error based on the equalized signal and the reconstructed signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
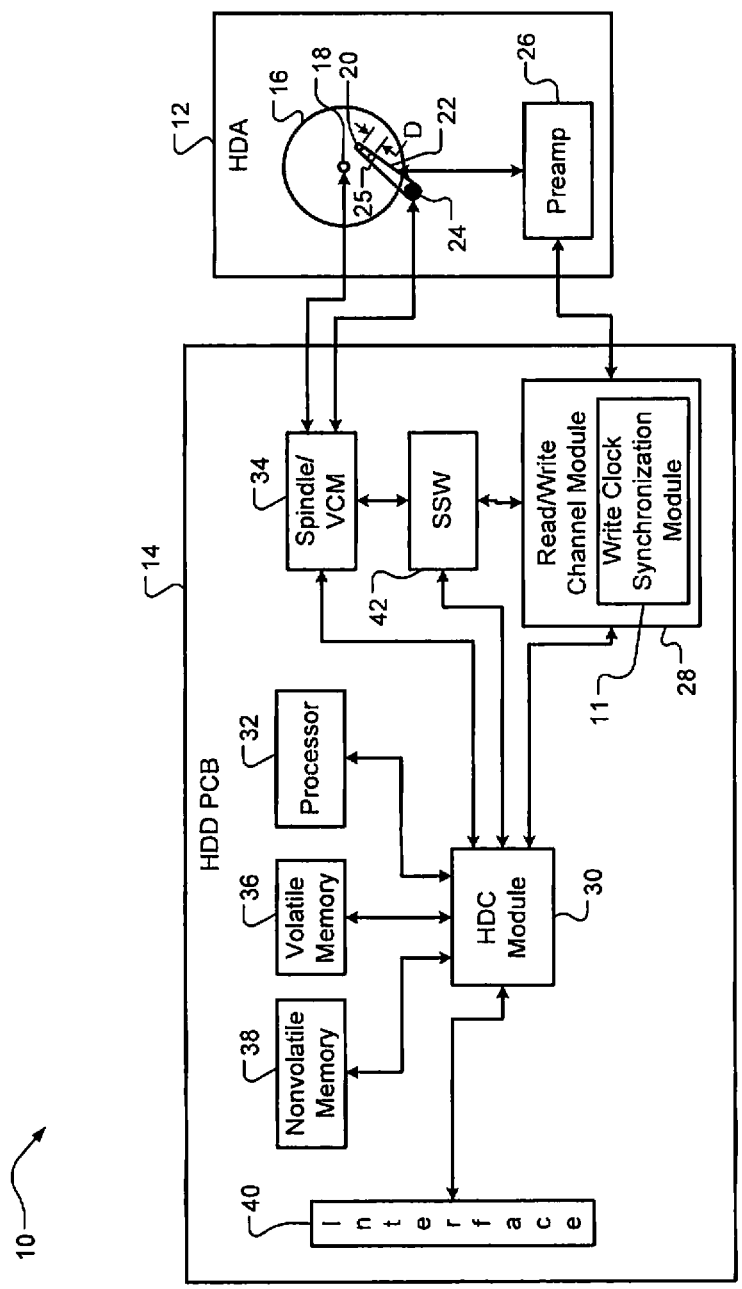
FIG. 1 is a functional block diagram of a hard disk drive system incorporating a write clock synchronization system in accordance with the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the terms first, second, third, etc. may be used herein to describe various elements, components, regions, areas, zones and/or sections, these elements, components, regions, areas, zones and/or sections should not be limited by these terms. These terms may be only used to distinguish one element, component, region, layer, zone or section from another element, component, region, layer, zone or section. Terms such as "first," "second," and other numerical terms when used herein do not imply a sequence or order unless clearly indicated by the context. Thus, a first element, component, region, area, zone or section discussed below could be termed a second element, component, region, area, zone or section without departing from the teachings herein.

In a continuous media system, disk synchronous write (DSW) operations may be performed to synchronize frequencies and phases of a write clock with continuous media. A $1^{st}$-order or $2^{nd}$-order phase-locked loop (PLL) may be used in a read/write channel to provide the synchronization. Use of the $1^{st}$-order or $2^{nd}$-order PLL can reduce a maximum clock phase error to 50%-60% of a bit period. In continuous media, a bit period corresponds to a collective width of grains associated with storing a bit. A maximum phase error of 50%-60% of a bit period is unacceptable for bit-patterned media (BPM) systems, as synchronization requirements for BPM are more stringent than continuous media. Disk synchronous write implementations are disclosed herein for BPM system that provide clock phase error of less than or equal to 20% of a bit period (i.e. width of a bit). The width of a bit refers to a distance along a track between a starting and ending edge of the bit, where the bit island is sitting in the middle.

In FIG. 1, a hard disk drive (HDD) system 10 incorporating a write clock synchronization module 11 is shown. The HDD system 10 includes a hard disk assembly (HDA) 12 and a HDD printed circuit board (PCB) 14. The HDA 12 includes one or more circular platters (i.e. disks) 16, which have magnetic surfaces that are used to store data magnetically. Data can be stored in either a continuous media format or bit-patterned format on the disks 16. The disks 16 are arranged in a stack, and the stack is rotated by a spindle motor 18. At least one read and write head assembly 20 (read/write head assembly 20) reads data from and writes data on the magnetic surfaces of the disks 16.

The write head assembly 20 includes a write element (write head), such as an inductor, that generates a magnetic field and a read element (read head), such as a magneto-resistive (MR) element, that senses the magnetic field on the disks 16. The write head assembly 20 is mounted at a distal end of an actuator arm 22. An actuator, such as a voice coil motor (VCM) 24, moves the actuator arm 22 relative to the disks 16.

The write head assembly 20 may include a synchronization sensor 25 or the synchronization sensor 25 may be mounted elsewhere, such as on the actuator arm 22 a distance D from the write head assembly 20, as shown. The distance D is fixed. The synchronization sensor 25 may be an optical sensor, a magnetic sensor, or other suitable sensor. An optical sensor may be used to detect a landscape of bit islands and grooves (non-magnetic areas between bit islands) of the BPM. A magnetic sensor may be used to detect magnetic fields around the bit islands.

The synchronization sensor 25 may be active while the write head is writing to the disks 16. In one implementation, the synchronization sensor 25 is not included and the read element is used as a synchronization sensor. The signals or magnetic field generated by the write head may be shielded away prior to being received by the read head to prevent the write head from negatively affecting operation of the read head. This allows the read head to be used as a synchronization sensor and be active while the write head is writing to the disks 16.

The HDA 12 includes a preamplifier device 26 that amplifies signals received from and sent to the write head assembly 20. The preamplifier device 26 generates a write current that flows through the write element of the write head assembly 20 when writing data. The write current is used to produce a magnetic field on the magnetic surfaces of the disks 16. Magnetic surfaces of the disks 16 induce low-level analog signals in the read element of the write head assembly 20 during reading of the disks 16. The preamplifier device 26 amplifies the low-level analog signals and outputs amplified analog signals to a read/write channel module 28.

The HDD PCB 14 includes the read/write channel module 28, a hard disk controller (HDC) 30, a processor 32, a spindle/VCM driver module 34, volatile memory 36, nonvolatile memory 38, and an input/output (I/O) interface 40. The read/write channel module 28 includes the write clock synchronization module 11.

Figure 2:
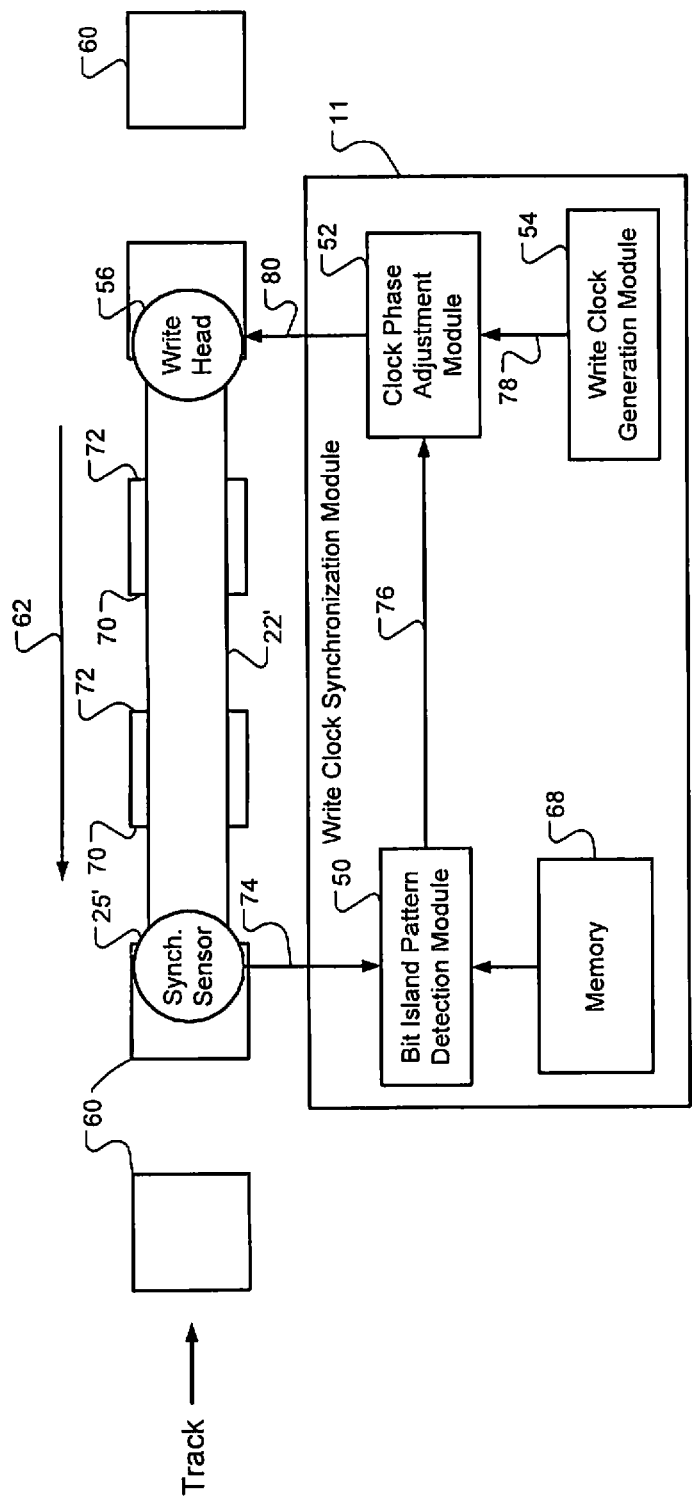
FIG. 2 is a functional block diagram of the write clock synchronization module in accordance with the present disclosure.
Figure 4:
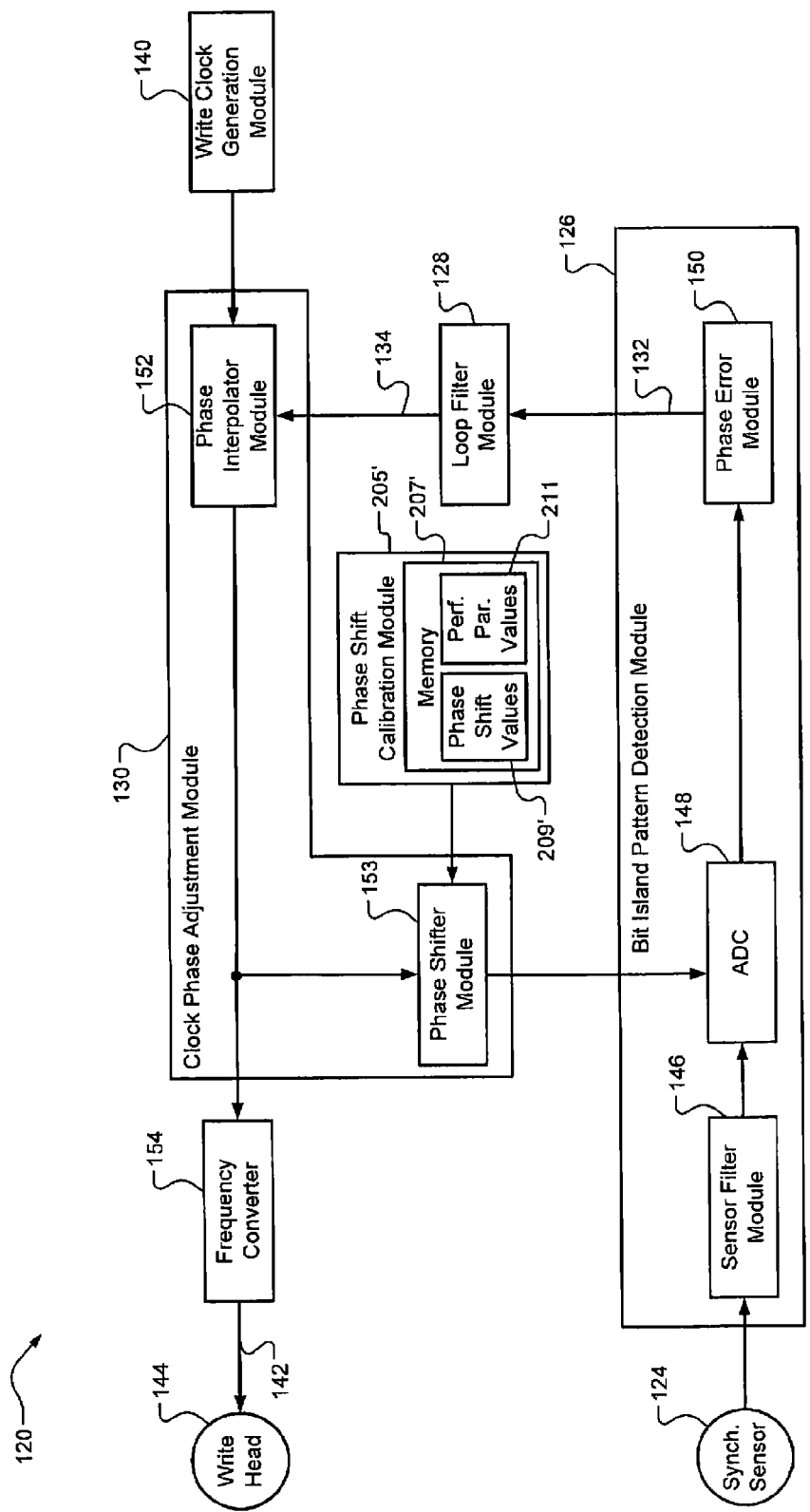
FIG. 4 is a functional block diagram illustrating a write clock synchronization system for a synchronization sensor incorporating a phase shifter module in accordance with the present disclosure.
Figure 5:
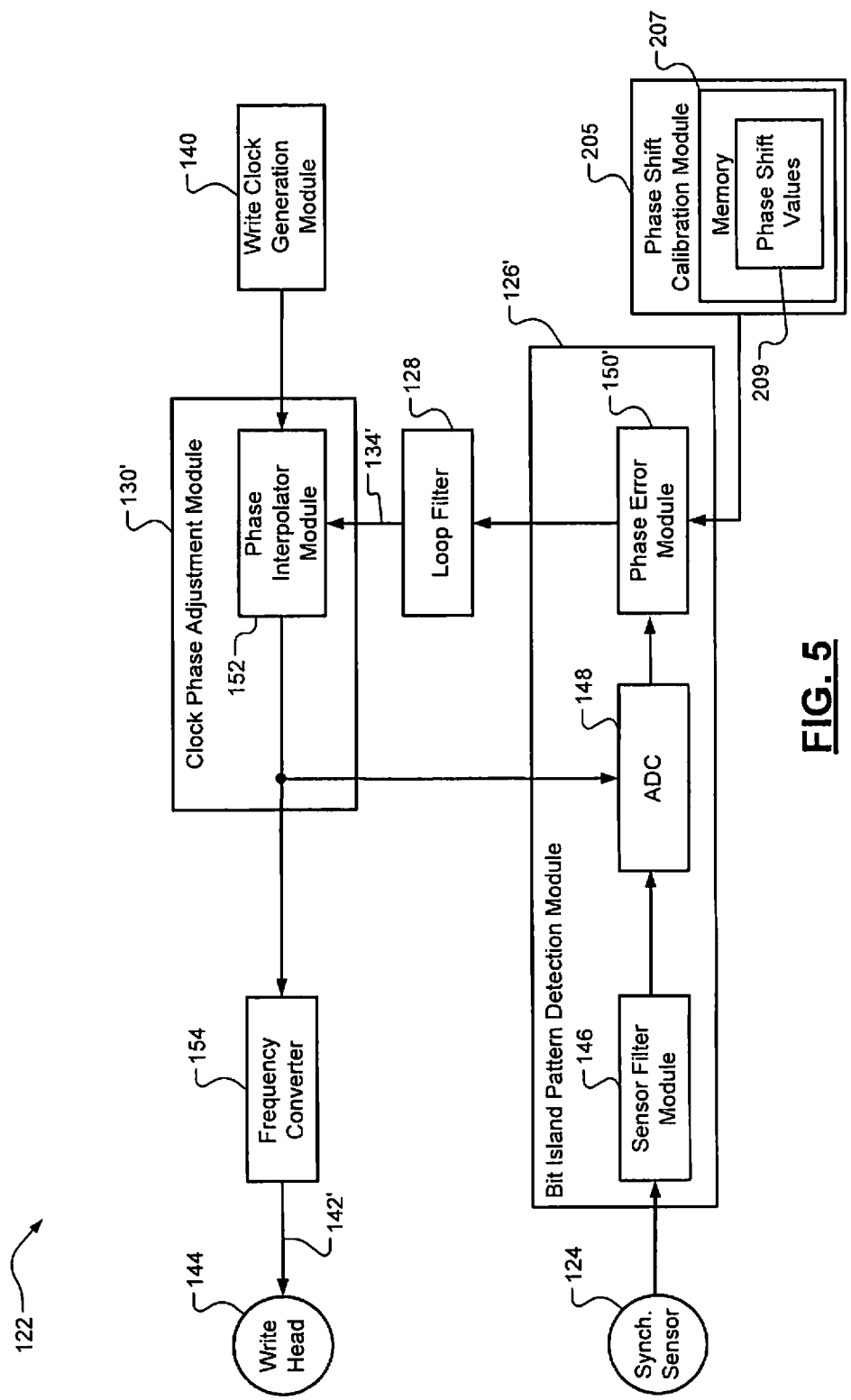
FIG. 5 is a functional block diagram illustrating another write clock synchronization system for the synchronization sensor of FIG. 4 with phase error calibration adjustment in accordance with the present disclosure.
Figure 7:
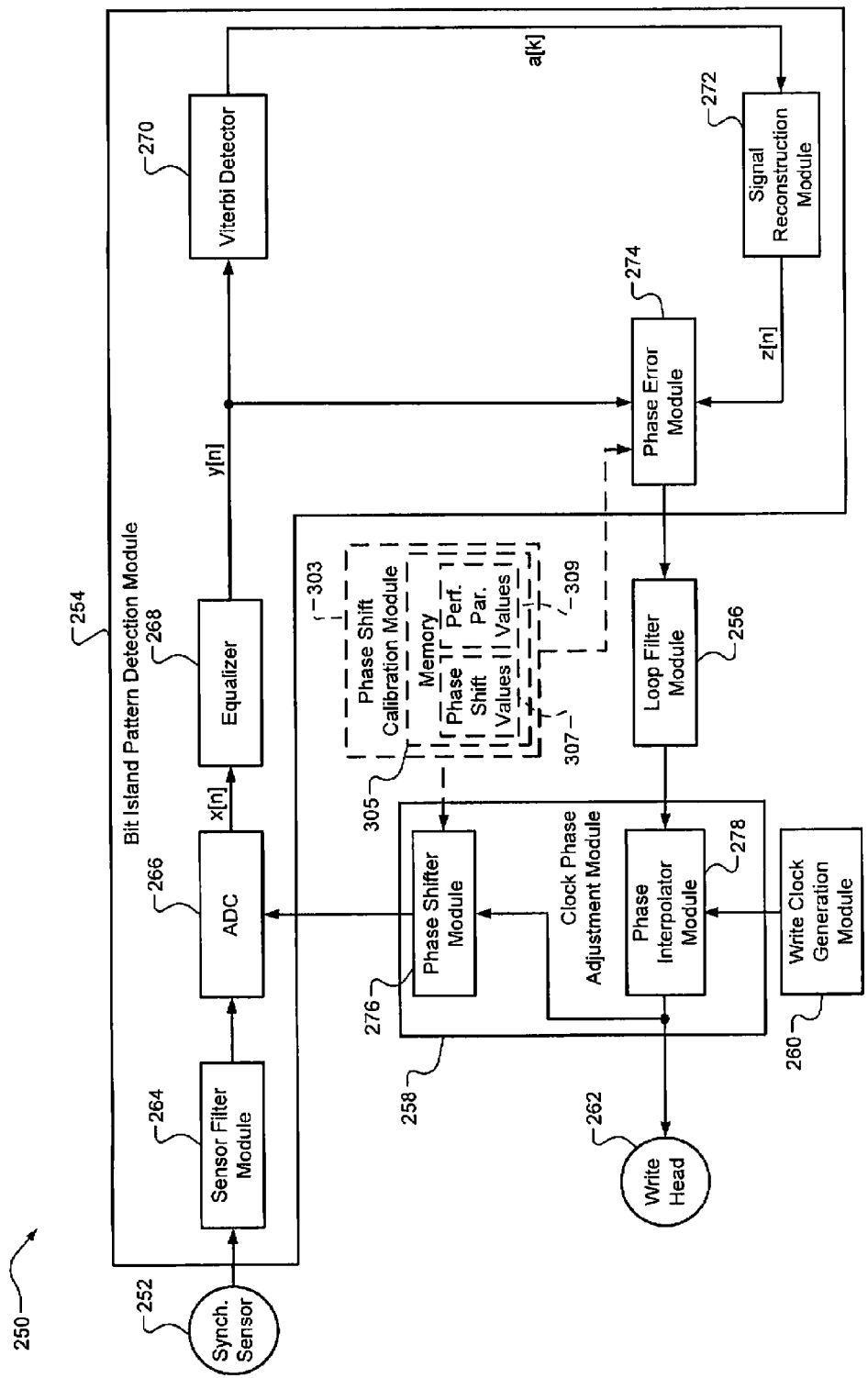
FIG. 7 is a functional block diagram illustrating another write clock synchronization system in accordance with the present disclosure.

The write clock synchronization module 11 synchronizes write clock signals with discontinuous bit islands ("bit islands") on the disks 16. The write clock synchronization module 11 aligns write clock signal pulses with the bit islands. In operation, the write clock synchronization system 11 detects a bit island pattern (i.e. bit island timing or phase of the bit islands) and adjusts the write clock signals based on the bit island pattern. The phase of the bit islands is directly related to start and end times associated with starting and ending edges of the bit islands. The synchronization sensor 25 generates a sensor signal based on the starting and ending edges. Phase ("sensor phase") of the sensor signal is directly related to and/or the same as phase ("bit island phase") of the bit islands. The write clock synchronization module 11 adjusts phase ("write clock phase") of the write clock signals based on the sensor phase. This adjustment may be provided using a closed phase lock loop (PLL), as shown in FIGS. 4, 5 and 7. An example of the write clock synchronization module 11 is shown in FIG. 2.

During write operations, the read/write channel module 28 may encode the data to increase reliability by using error-correcting codes (ECC) such as run length limited (RLL) code, Reed-Solomon code, etc. The read/write channel module 28 then transmits the encoded data to the preamplifier device 26. Data is written to the bit islands based on the synchronized write clock signals. During read operations, the read/write channel module 28 receives analog signals from the preamplifier device 26. The read/write channel module 28 converts the analog signals into digital signals, which are decoded to recover the original data.

The HDC module 30 controls operation of the HDD system 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device, via the interface 40. The HDC module 30 may receive data to be stored from the external device, and may transmit retrieved data to the external device.

The processor 32 processes data, including encoding, decoding, filtering, and/or formatting. Additionally, the processor 32 processes servo or positioning information to position the read/write head assembly 20 over the disks 16 during read/write operations. Servo, which is stored on the disks 16, ensures that data is written to and read from correct locations on the disks 16. In some implementations, a self-servo write (SSW) module 42 may write servo on the disks 16 using the write head assembly 20 prior to storing data on the HDD 10.

In FIG. 2, the write clock synchronization module 11 is shown. The write clock synchronization module 11 includes a bit island pattern detection module 50, a clock phase adjustment module (or delay module) 52, and a write clock generation module 54. The write clock synchronization module 11 synchronizes a write clock with the media based on a bit island pattern detected by a synchronization sensor 25'. The synchronization sensor 25' may be mounted on a slider or actuator arm 22' and be a fixed distance from the write head 56. The synchronization sensor 25' may be at various locations relative to the write head 56. In FIG. 2, the synchronization sensor 25' is located forward of the write head 56 relative to a rotation direction of BPM. The synchronization sensor 25' detects bit islands 60 on a track of the BPM prior to the bit islands 60 rotating under the write head 56. Arrow 62 illustrates order of the bit islands 60 along the track, which is opposite the rotational direction of the BPM.

Figure 3:
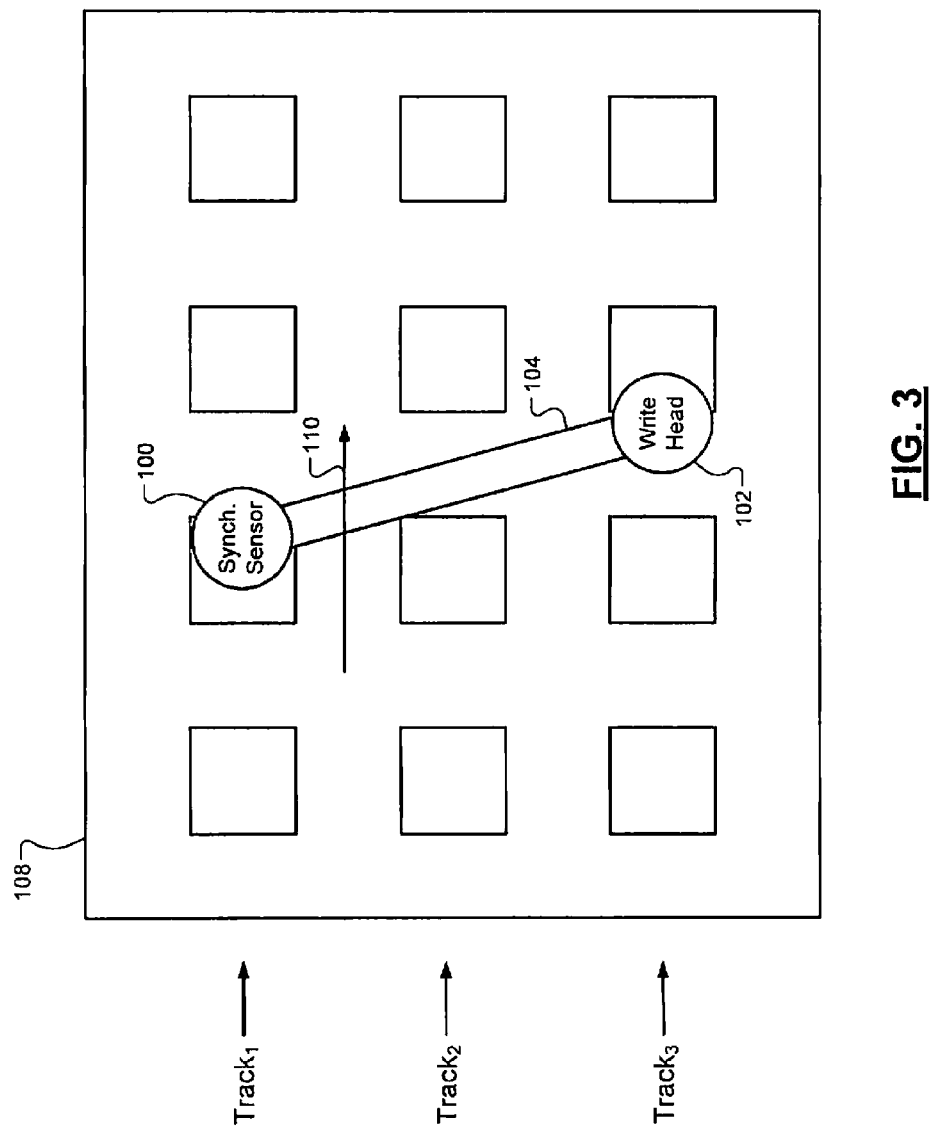
FIG. 3 is a bit-patterned media track diagram illustrating a write head and synchronization sensor relationship in accordance with the present disclosure.
Figure 8:
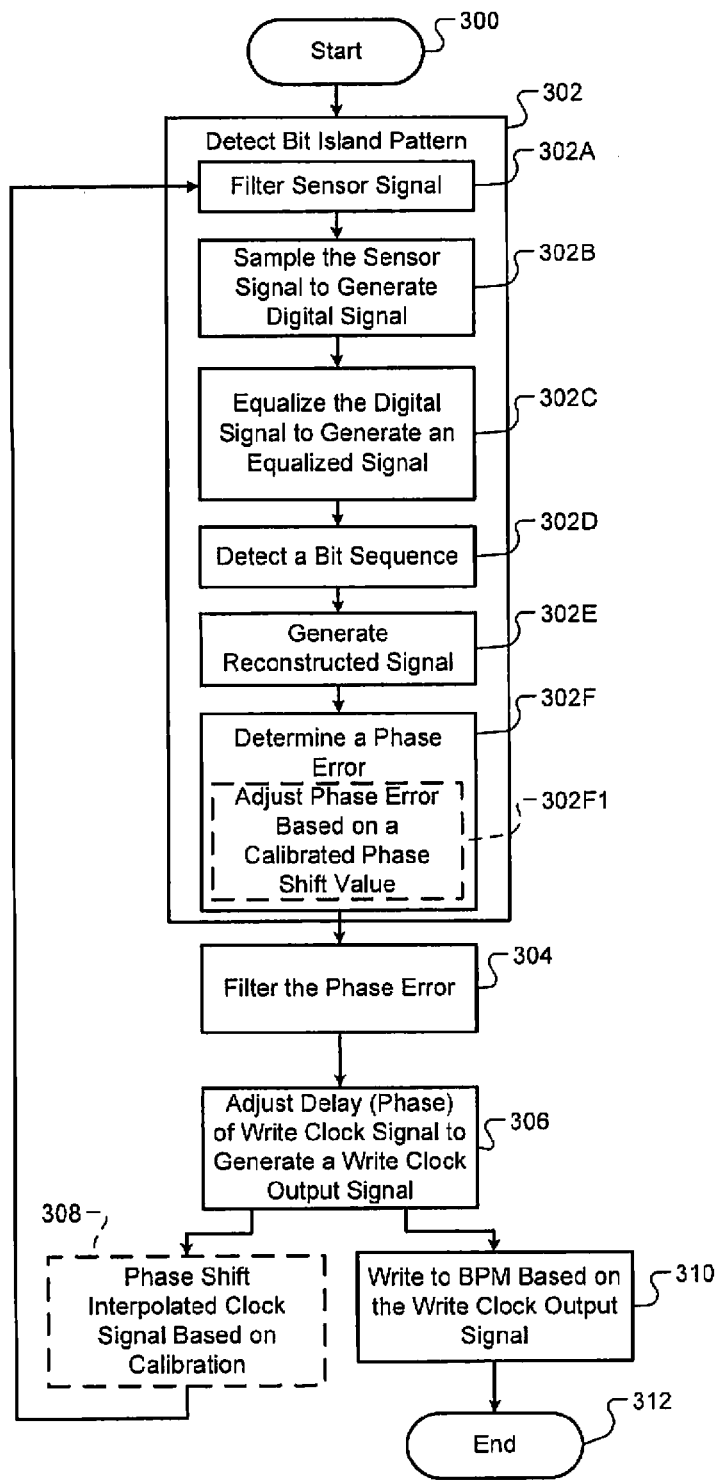
FIG. 8 illustrates a method of synchronizing a write clock signal generated by the write clock synchronization system of FIG. 7.

A synchronization sensor may detect bit islands on the same track as bit islands written to by the write head (as shown in FIG. 2) or may detect bit islands on a different track (as shown in FIGS. 3 and 8). In other words, the write head may write to the same bit islands monitored by a synchronization sensor or may write to bits islands in a different track than the track monitored by the synchronization sensor. A different track may be monitored, as bit island patterns (or phases of bit islands) of different tracks of BPM may be similar or essentially identical. The bit island patterns may be essentially identical when the tracks are in the same zone of the BPM. A zone may refer to an area of the BPM and/or to a set of tracks that include bit islands having the same bit island pattern. A bit island pattern may refer to sizes of bit islands, distances between bit islands, arrangement of bit islands, number of bit islands per unit area of the BPM, etc.

Sensor signals generated by the synchronization sensor 25' may be adjusted based on whether the synchronization sensor 25' is monitoring bit islands in the same zone as bit islands to which data is being written by the write head 56. For example, phases and/or frequencies of the sensor signals may be adjusted to compensate for differences in bit island patterns between the bit islands detected by the synchronization sensor 25' and bit islands written to by the write head 56. Phases and frequencies of sensor signals and corresponding bit island pattern information for each zone may be stored in memory 68 of the write clock synchronization module 11. The bit island pattern detection module 50 may access the phase and frequency information stored in the memory 68 and adjusts the sensor signals accordingly. The sensor signals may be adjusted to compensate for differences in a first bit island pattern of a first zone monitored by the synchronization sensor 25' and a second bit island pattern of a second zone written to by a write head.

The bit island pattern detection module 50 detects a bit island pattern based on detection of starting and ending edges (e.g., starting edges 70 and ending edges 72) of the bit islands 60. Surface geometry variations associated with the bit islands 60 provide timing information for write clock synchronization. The timing information is provided based on physical characteristics of the bit islands 60 and not based on preambles of data signals. The synchronization sensor 25' generates a sensor signal 74 that indicates timing of the starting and ending edges of the bit islands 60.

The bit island pattern detection module 50 generates a phase error (or delay adjustment) signal 76 based on the periodic pattern of the sensor signal. The bit island pattern detection module 50 determines the phase of the sensor signal and associated phase error. The phase error may be determined based on a desired or predetermined (desired) phase, as further described below.

The clock phase adjustment module 52 adjusts and/or selects a write clock signal 78 received from the write clock generation module 54 based on the phase error. The clock phase adjustment module 52 may delay the write clock signal 78 for a fixed amount of time or adjust phase of the write clock signal 78 to generate a write clock output signal 80. The delay or amount of phase adjustment may be determined based on distance between the synchronization sensor 25' and the write head 56 and/or position of the synchronization sensor 25' relative to the write head 56. The delay or amount of phase adjustment may alternatively be based on the phase error and/or a calibrated phase shift value, as further described below. The write clock output signal 80 may be provided to the write head 56 and/or used to control write operations of the write head 56. Examples of the bit island pattern detection module 50, the clock phase adjustment module 52, and the write clock generation module 54 are shown in FIGS. 4, 5 and 7.

In FIG. 3, a write head and synchronization sensor relationship is shown. A synchronization sensor 100 and a write head 102 are mounted on a slider 104. Tracks of BPM 108 rotate relative to the slider 104 in a direction indicated by arrow 110. The synchronization sensor 100 is used to detect a bit island pattern of a track (e.g., track$_1$) while the write head 102 writes bits in bit islands 103 of a different track (e.g., track$_3$). Phase of a write clock signal may be adjusted based on the bit island pattern detected using the synchronization sensor 100. The write clock signal may be provided to the write head and/or used to write data via the write head 102. The write head 102 and synchronization sensor relationship of FIG. 3 may be used in the implementations of FIGS. 1, 4, 5, and 7.

In FIGS. 4-5, first and second write clock synchronization systems 120, 122 for a first synchronization sensor 124 (e.g., optical sensor) are shown. Although the write clock synchronization systems 120, 122 are described primarily in association with an optical sensor, the write clock synchronization systems 120, 122 may be used with other types of synchronization sensors.

The write clock synchronization systems 120, 122 include phase lock loops (PLLs) with bit island pattern detection modules 126, 126', a loop filter 128, and clock phase adjustment modules 130, 130'. The bit island pattern detection modules 126, 126' generate phase error signals 132, 132' based on sensor signals from the first synchronization sensor 124. The loop filter 128 filters the phase error signals to generate filtered phase error signals 134, 134'. The clock phase adjustment modules 130, 130' may adjust and/or select a write clock signal from a write clock generation module 140 based on the filtered phase error signals 134, 134'. The clock phase adjustment modules 130, 130' may adjust phase and/or frequency of the write clock signal and/or select the phase and/or frequency of the write clock signal.

The bit island pattern detection modules 126, 126' include a sensor filter module 146, an analog-to-digital converter (ADC) 148, and phase error modules 150, 150'. The clock phase adjustment modules 130, 130' include a phase interpolator module 152 and may include a phase shifter module 153 (shown in FIG. 4). Output of the phase interpolator module 152 is provided to a frequency converter 154 (e.g., N:1 frequency converter), where N is an integer greater than 1. The frequency converter 280 generates write clock output signals 142, 142', which may be provided to a write head 144.

The first and second write clock synchronization systems 120, 122 may include respective a phase shift calibration modules 205, 205' with memories 207, 207'. The memories may store phase shift values 209, 209' and/or performance parameter values 211, 211'. The values 209, 209' 211, 211' may be calibrated values and/or values determined and/or calculated by the phase shift calibration modules 205, 205'. Use and operation of the phase shift calibration modules 205, 205' are described below with respect to FIGS. 6, 8, 11 and 12.

Figure 6:
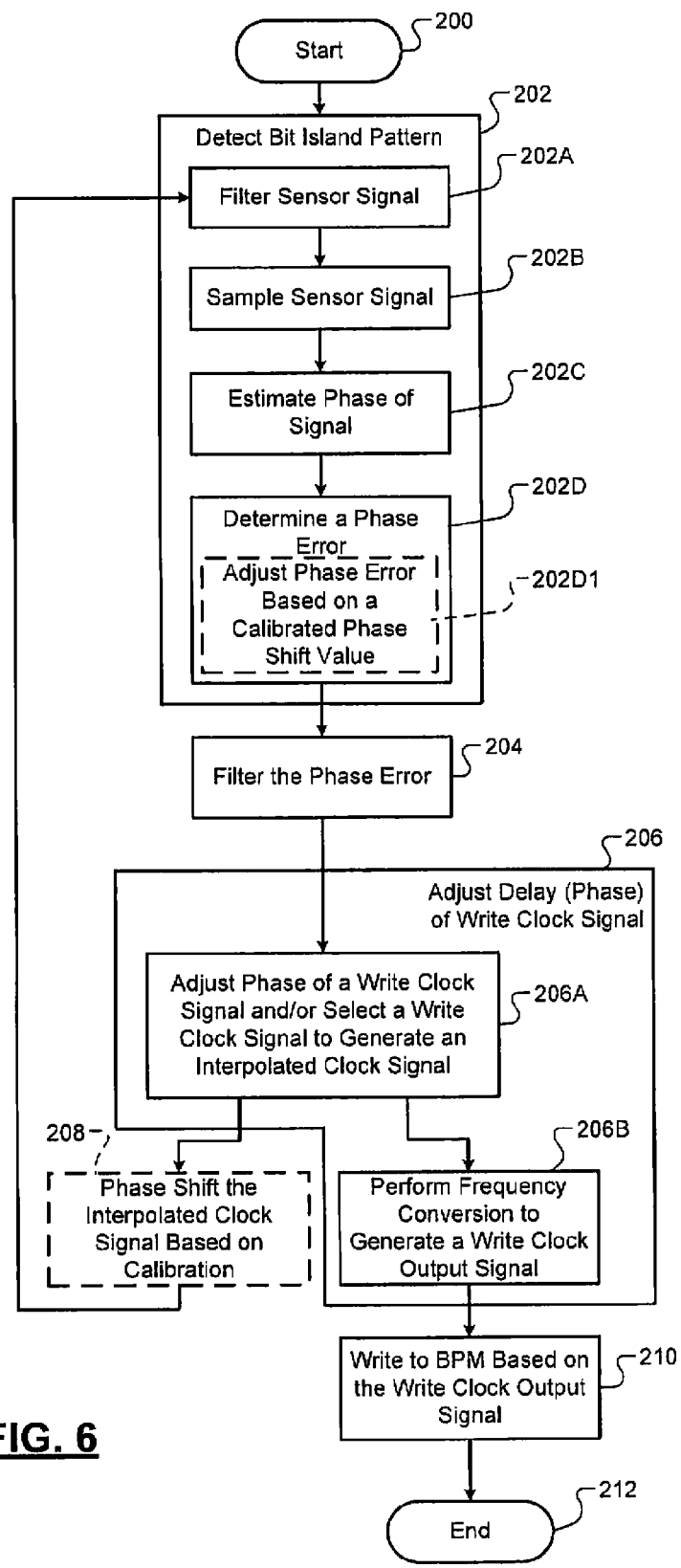
FIG. 6 illustrates methods of synchronizing write clock signals generated by the write clock synchronization systems of FIGS. 4-5.

Referring now also to FIG. 6, method(s) of synchronizing write clock signals of the write clock synchronization systems 120, 122 of FIGS. 4-5 are shown. Although the following tasks 202-212 are primarily described with respect to the implementations of FIGS. 4 and 5, the tasks 202-212 may be easily modified to apply to other implementations of the present disclosure. The tasks 202-212 and/or a portion thereof may be iteratively performed. The method may begin at 200.

At 202, a bit island pattern detection module (e.g., one of the bit island pattern detection modules 126, 126') detects a bit island pattern and generates a phase error signal (e.g., one of the phase error signals 132, 132'). At 202A, the sensor filter module 146 filters a sensor signal generated by the first synchronization sensor 124 to remove noise from the sensor signal. The sensor filter module 146 generates a filtered sensor signal. The sensor filter module 146 filters and/or processes the sensor signal to generate the filtered sensor signal, which may have a periodic and/or sinusoidal pattern. The sensor filter module 146 may convert the sensor signal having a periodic pattern into the filtered sensor signal having a sinusoidal pattern.

At 202B, the ADC 148 samples and converts the filtered sensor signal from an analog signal to a digital signal. The sampling rate of the ADC 148 may be a multiple M of the frequency of data in the analog signal, where M is an integer greater than 1. The digital signal can be represented by, for example, equation 1 below, where x[n] is the filtered sensor signal, n is the sample number, N is the total number of samples, A is amplitude, f is frequency, and $\theta$ is phase of the filtered sensor signal.

$$x[n] = A\sin(2\pi fn + \theta), n = 0, 1, \ldots, N-1 \quad (1)$$

The ADC 148 may sample the filtered sensor signal based on a phase adjusted clock signal (e.g., an interpolated clock signal generated at 206). The phase adjusted clock signal may be generated by the phase shifter module 153 (as shown in FIG. 4) or by the phase interpolator module 152 (as shown in FIG. 5). Frequency of the interpolated clock signal may be greater than the data bit frequency to avoid aliasing.

At 202C, a phase error module (e.g., one of the phase error modules 150, 150') estimates phase (and/or frequency) of the digital signal. As a first example, the estimated phase may be determined using equation 2 below, where $\hat{\theta}$ is the estimated phase.

$$\hat{\theta} = \tan^{-1}\left(\frac{\sum_{n=0}^{N-1} \times [n]\cos(2\pi fn)}{\sum_{n=0}^{N-1} \times [n]\sin(2\pi fn)}\right) \quad (2)$$

As another example, the phase error module may estimate the phase of the digital signal using, for example, equations 3 and 4 below based on an assumption that phase error $\epsilon$ is small.

$$x[0] = A\sin(\theta) \approx A\theta \quad (3)$$

$$\hat{\theta} = A\theta \quad (4)$$

In this example, the sample x[0] provides an estimate of the phase and can be used as an estimate of the phase error $\epsilon$ at 202D (i.e. $\epsilon \approx x[n]$), wherein x[0] is proportional to the phase $\theta$.

At 202D, the phase error module determines the phase error $\epsilon$ and generates the phase error signal based on the estimated phase $\hat{\theta}$ and a first predetermined (or desired) phase $\theta_D$. The first predetermined phase $\theta_D$ may, for example, be set to 0. The phase error $\epsilon$ may be determined using, for example, equation 5.

$$\epsilon = \theta_D - \hat{\theta} \quad (5)$$

The phase error $\epsilon$ may be equal to $-\hat{\theta}$ when the first predetermined phase $\theta_D$ is set equal to 0.

At 202D1, the first predetermined phase $\theta_D$ may be adjusted by the phase shift calibration module 205 (shown in FIG. 5) included in the write clock synchronization system 120. A phase shift value (or phase offset) may be used to adjust and/or offset the first predetermined phase $\theta_D$. A method of calibrating the phase shift values is described with respect to FIGS. 9-11. Task 202D1 may be performed instead of task 208.

At 204, the loop filter 128 filters the phase error signal to suppress noise associated with the phase error computations performed at 202. The loop filter 128 may be a proportional-integral (PI) type filter with a transfer function provided by, for example equation 6 below, where H(z) is the transfer function, $\alpha$ and $\beta$ are constants.

$$H(z) = \alpha + \frac{\beta}{1 - z^{-1}} \quad (6)$$

At 206, the phase interpolator module 152 performs one or more of the following operations: adjusts phase of a write clock signal generated by the write clock generation module 140; selects phase of the write clock signal; and/or selects a write clock signal based on the output of the loop filter 128 (filtered phase error signal). The phase interpolator module 152 performs the operations to generate the interpolated clock signal with phase that minimizes the resulting phase error determined at 202D. The phase interpolator module 152 may also adjust frequency and/or select a frequency of the write clock signal(s) generated by the write clock generation module 140 relative to a frequency of the bit islands. The frequency of the write clock signal(s) generated by the write clock generation module 140 may be adjusted such that frequency of a write clock output signal generated at 206B is the same as frequency of the sensor signal.

The phase and frequency control performed by the phase interpolator module 152 ensures that the interpolated clock signal, subsequent to frequency conversion by the frequency converter 154, is aligned with (i.e., has the same phase and/or frequency as) the sensor signal. This minimizes a bit error rate (BER) of the data written to the bit islands. Since the sensor signal contains timing information associated with the bit island patterns on BPM, frequency of the write clock output signal is the same as frequency of the bit islands and/or bits passing the first synchronization sensor 124. The write clock output signal is generated by the frequency converter 154 at 206B.

The write clock generation module 140 may generate one or more write clock signals. Each of the write clock signals may have a different fixed phase. For example, the write clock generation module 140 may generate write clock signals having phases provided by, for example, equation 7 below, where $\theta_w$ is the phase for a write clock signal i, i is the write clock signal number, I is the number of different phases and/or write clock signals.

$$\theta_W = \frac{2\pi i}{I}, i = 0, 1, \ldots, I-1 \quad (7)$$

The write clock generation module 140 may generate the write clock signals based on the output of the loop filter 128. The write clock generation module 140 may select phase(s) of the write clock signals based on the output of the loop filter 128. The output of the loop filter 128 may be a "phase jump" or amount of phase adjustment to be: applied to a write clock signal generated by the write clock generation module 140; used to select a phase of the write clock signal; and/or used to select a write clock signal generated by the write clock generation module 140.

The phase interpolator module 152 may select two phases that are closest to a second predetermined (or desired) phase. The write clock signals with the two phases may be linearly combined to generate the interpolated clock signal with the second predetermined phase. The phase interpolator module 152 may interpolate between the two phases or write clock signals to generate the interpolated clock signal. The interpolation allows a write clock signal with any arbitrarily selected phase value to be generated regardless of whether the hardware associated with the write clock generation module is phase limited. The write clock generation module 140 may include delay elements to provide write clock signals with different phase.

At 208, the phase shifter module 153 may generate the phase shifted write clock signal based on the interpolated clock signal. The phase shifter module 153 may adjust phase of the interpolated clock signal based on a phase shift value from the phase shift calibration module 205' (shown in FIG. 4).

The phase shift calibration module 205' selects the phase shift value that has the best performance parameter value or set of performance parameter values (e.g., the performance parameter values 211). As an example, the phase shift calibration module 205' may select a phase shift value associated with a minimum phase error value and adjust the interpolated clock signal based on the phase shift value.

Figure 9:
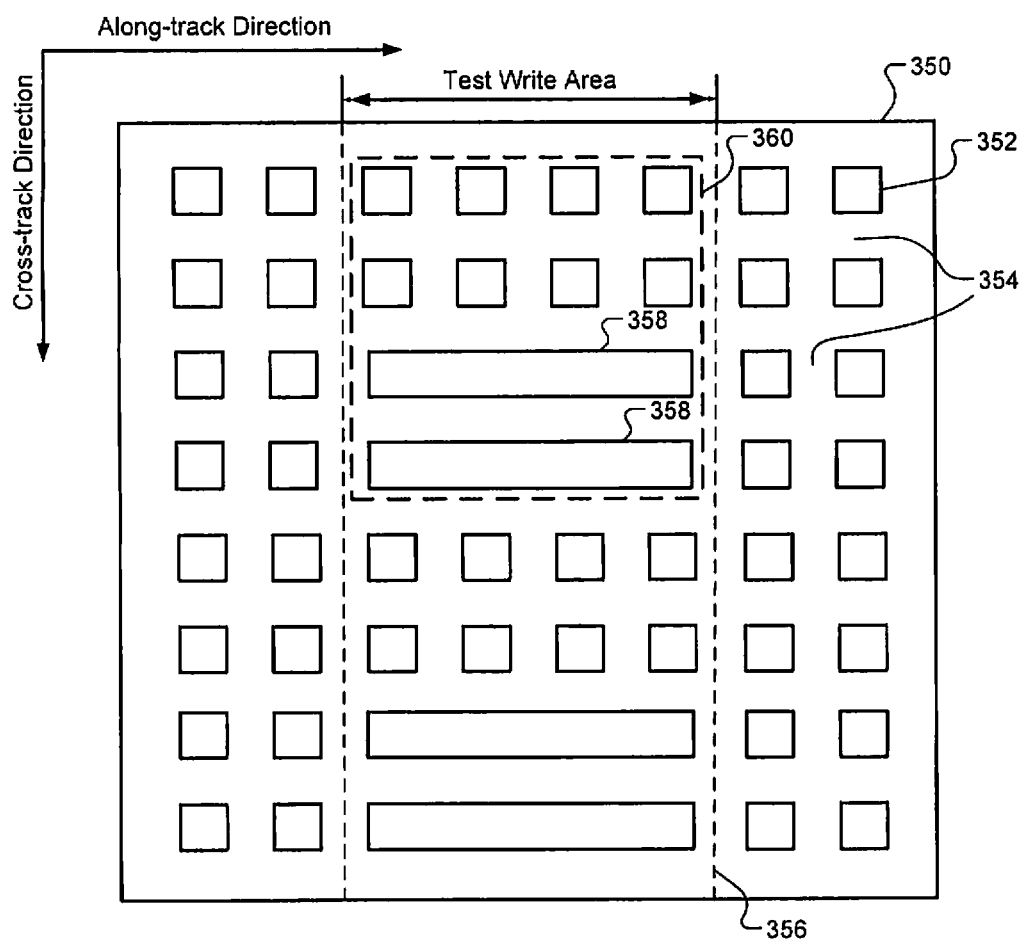
FIG. 9 is a top view of a zone of bit-patterned media with connected bit islands in accordance with the present disclosure.
Figure 10:
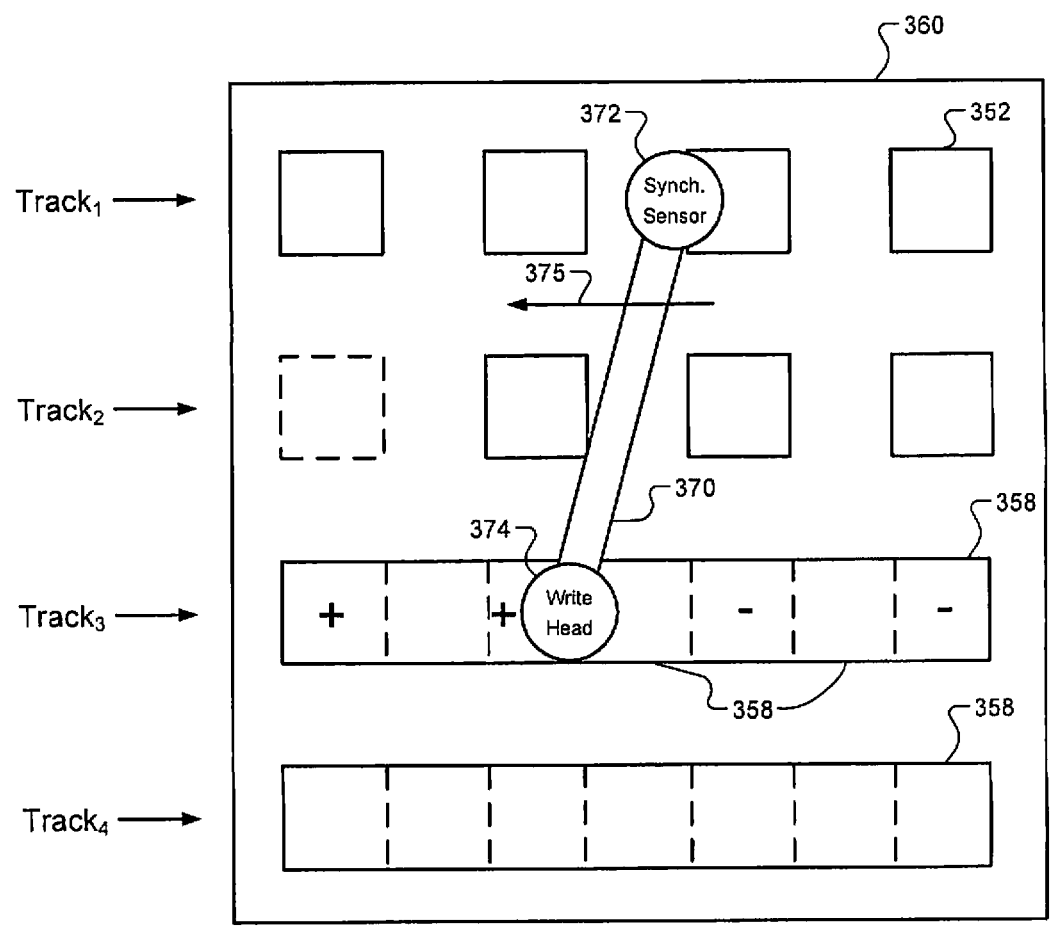
FIG. 10 is a bit-patterned media track diagram illustrating a test write operation in accordance with the present disclosure.
Figure 11:
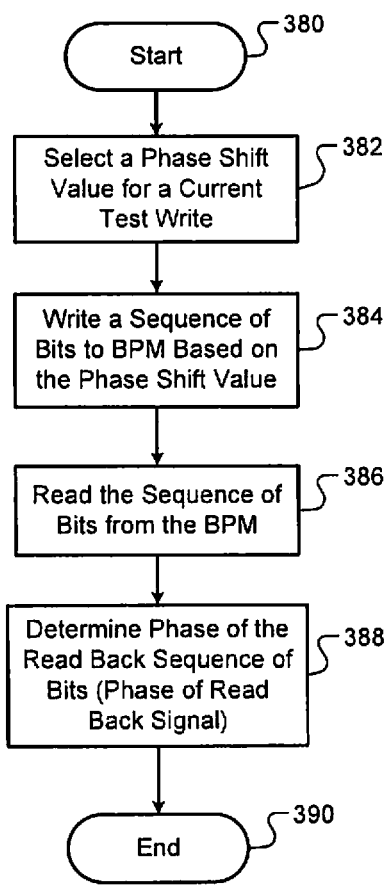
FIG. 11 illustrates a method of calibrating a phase shift value for continuous media in accordance with the present disclosure.

A method of calibrating phase shift values is described with respect to FIGS. 9-11. Although the phase shift values generated by the phase shift calibration modules 205, 205' may be provided to the phase shifter module 153 and/or the phase error module 150', the phase shift values may also be provided to the phase interpolator module 152. The phase interpolator module 152 may adjust and/or select phase of the write clock signal generated by the write clock generation module 140 based on a selected phase shift value.

The phase shifter module 153 adjusts the phase of the interpolated clock signal to maintain a constant phase difference between the phase of the sensor signal and phase of the interpolated clock signal. The interpolated clock signal may be adjusted to be in alignment (in phase) with the sensor signal and/or the digital signal. The constant phase difference may be a predetermined difference. Task 208 may be performed instead of task 202D1.

Use of the phase shifter module 153 can improve calibration of the phase shift values, which improves phase locking performance of the PLL. Task 202 may be performed subsequent to task 208.

At 206B, the frequency converter 154 converts the interpolated clock signal into the write clock output signal. Frequency of the write clock output signal may be the same as frequency of the sensor signal and/or frequency of the bit islands. At 210, data may be written to the bit islands based on the write clock output signal. The method may end at 212.

In FIG. 7, a write clock synchronization system 250 for a second type of synchronization sensor 252 (e.g., magnetic sensor) is shown. Although the write clock synchronization system 250 is described primarily in association with a magnetic sensor, the write clock synchronization system 250 may be used with other types of synchronization sensors.

The write clock synchronization system 250 includes a bit island pattern detection module 254, a loop filter module 256, and a clock phase adjustment module 258. The bit island pattern detection module 254 generates a phase error signal based on a sensor signal from the synchronization sensor 252. The loop filter module 256 filters the phase error signal. The clock phase adjustment module 258 may adjust and/or select a write clock signal from a write clock generation module 260 based on the filtered phase error signal.

The bit island pattern detection module 254 includes a sensor filter module 264, an ADC 266, an equalizer 268, a viterbi detector 270, a signal reconstruction module 272, and a phase error module 274. The clock phase adjustment module 258 includes a phase shifter module 276 and a phase interpolator module 278.

Referring now also to FIG. 8, a method of synchronizing a write clock signal generated by the write clock synchronization system 250 of FIG. 7 is shown. Although the following tasks 302-312 are primarily described with respect to the implementation of FIG. 7, the tasks 302-312 may be easily modified to apply to other implementations of the present disclosure. The tasks 302-312 and/or a portion thereof may be iteratively performed. The method may begin at 300.

At 302, the bit-pattern detection module 254 detects the bit island pattern and generates the phase error signal. At 302A, the sensor filter module 264 filters the sensor signal generated by the second synchronization sensor 252 to remove noise from the sensor signal. The sensor filter module 264 generates a filtered sensor signal. The filtered sensor signal has a periodic pattern and through filtering may have a sinusoidal pattern.

At 302B, the ADC 266 samples the filtered sensor signal and converts the sensor signal from analog signal to a digital signal x[n]. The ADC 266 may sample the filtered sensor signal based on a phase adjusted clock signal (e.g., an interpolated clock signal generated at 306). The phase adjusted clock signal may be generated by the phase shifter module 276. The digital signal x[n] may be represented by, for example, equation 8 below, where a[k] is the bit polarization of the $k^{th}$ magnetic island, p[n] is the impulse response function of a signal bit island, and n and k are integers.

$$x[n]=\Sigma_k a[k]p[n-k] \tag{8}$$

At 302C, the equalizer 268 equalizes the digital signal x[n] to generate equalized signal y[n]. The equalized signal y[n] may be represented by, for example, equation 9 below, where q[n] is a predetermined pulse shape.

$$y[n]=\Sigma_k a[k]q[n-k] \tag{9}$$

In the presence of phase error ϵ, y[n] may be represented by, for example, equation 10.

$$y[n]=\Sigma_k a[k]q[n-k-\epsilon] \tag{10}$$

A magnetic sensor, such as the synchronization sensor 252, senses pre-written data on the BPM. Due to the presence of inter-symbol interference (ISI), the digital signal is equalized prior to detection of stored bits. The equalizer 268 mitigates the effect of the interferences by converting the pulse shape associated with p[n] to the predetermined pulse shape q[n]. The equalizer 268 removes unrecognizable variances and/or irregularities in p[n] to generate q[n], which is recognizable by the Viterbi detector 270.

At 302D, the Viterbi detector 270 detects the bit sequence a[k], k=1, 2, . . . since the predetermined pulse shape q[n] is recognizable. At 302E, the signal reconstruction module 272 generates a reconstructed signal based on the detected bit sequence a[k], k=1, 2, . . . . The reconstructed signal may be represented by, for example, equation 11.

$$z[n]=\Sigma_k a[k]q[n-k] \tag{11}$$

At 302F, the phase error module 274 estimates the phase error based on the equalized signal y[n] and the reconstructed signal z[n]. The phase error may be derived based on a difference between the equalized signal y[n] and the reconstructed signal z[n].

In one implementation, the phase error is determined based on a peak in a cross-correlation between up-sampled versions of the equalized signal y[n] and the reconstructed signal z[n]. Equation 12 may be provided using a first order approximation to link y[n] to z[n].

$$y[n] = \sum_k a[k]q[n-k-\varepsilon] \approx \qquad (12)$$

$$\sum_k a[k]q[n-k] - \left(\sum_k a[k]q[n-k] - \sum_k a[k]q[n-k-1]\right)\varepsilon \approx$$

$$z[n] - (z[n] - z[n-1])\varepsilon$$

The estimated phase error $\hat{\varepsilon}$ may be determined using, for example, equation 13 below, which may be derived based on equation 12.

$$\hat{\varepsilon} = \frac{\sum_{n=0}^{N-1}(y[n] - z[n])(z[n-1] - z[n])}{\sum_{n=0}^{N-1}(z[n-1] - z[n])^2} \qquad (13)$$

At 302F1, the phase error module 274 may adjust the estimated phase error $\hat{\varepsilon}$ based on a phase shift value generated by a phase shift calibration module 303. The phase shift calibration module 303 may include memory 305 and store phase shift values 307.

A phase shift value (or phase offset) associated with a best performance parameter value and/or set of performance parameter values (e.g., performance parameter values 309) may be selected and used to adjust or offset the estimated phase error $\hat{\varepsilon}$. A method of calibrating the phase shift value is described with respect to FIGS. 9-11. Task 302F1 may be performed instead of task 308.

At 304, the loop filter module 256 filters the phase error signal to suppress noise associated with the phase error computations at 302. The loop filter module 256 may be a proportional-integral (PI) type filter with a transfer function provided by, for example, equation 6.

At 306, the phase interpolator module 278 performs one or more of the following operations: adjusts phase of a write clock signal generated by the write clock generation module 260; selects a write clock signal phase; and/or selects a write clock signal based on the output of the loop filter module 256 (filtered phase error signal). The phase interpolator module 278 performs the operations to adjust write clock phase relative to the bit island pattern to minimize the resulting phase error determined at 302F. The phase interpolator module 278 may also adjust frequency and/or select frequency of the write clock signal relative to frequency of the bit islands, such that the write clock output signal has the same frequency as the frequency of the sensor signal.

The phase control performed by the phase interpolator module 278 ensures that the interpolated clock signal (the write clock output signal) generated at 306 is aligned with (i.e., has the same phase as) the sensor signal. Since the sensor signal contains timing information associated with the bit island patterns on the BPM, frequency of the write clock output signal is the same as frequency of the bit islands or bits passing the synchronization sensor 252.

The output of the loop filter module 256 is a "phase jump" or amount of phase adjustment to be applied to a write clock signal generated by the write clock generation module; used to select a phase of the write clock signal; and/or used to select a write clock signal generated by the write clock generation module 260.

The write clock generation module 260 may generate one or more write clock signals. Each of the write clock signals may have a different fixed phase. For example, the write clock generation module 260 may generate write clock signals having phases provided by, for example, equation 7. The write clock generation module 260 may generate the write clock signals based on the output of the loop filter module 256. The write clock generation module 260 may select phase(s) of the write clock signals based on the output of the loop filter module 256.

The phase interpolator module 278 may select two phases that are closest to a predetermined (or desired) phase. The write clock signals with the two phases may be linearly combined to generate the interpolated clock signal with the predetermined (or desired) phase. The phase interpolator module 278 may interpolate between the two phases or write clock signals to generate the interpolated clock signal.

At 308, the phase shifter module 276 may generate the phase shifted write clock signal based on the interpolated clock signal. The phase shifter module 276 may adjust phase of the interpolated clock signal based on a phase shift value from the phase shift calibration module 303. A phase shift value maintains a phase difference between a desired write clock signal and the sensor signal, because a constant phase difference may exist between the desired write clock signal and an expected sensor signal. A method of calibrating the phase shift values is described with respect to FIGS. 9-11.

The phase shifter module 276 adjusts the phase of the interpolated clock signal to maintain a constant phase difference between the phase of the sensor signal and phase of the interpolated clock signal. The interpolated clock signal may be adjusted to be in alignment (in phase) with the sensor signal. The constant difference may be a predetermined difference. Task 308 may be performed instead of task 302F1.

At 310, data may be written to the BPM based on the write clock output signal. The method may end at 312.

Test Write Calibration

Phase difference between a sensor signal generated by a synchronization sensor and a desired write clock signal can vary based on temperature and BPM imperfections. A test write calibration method is described below to account for these variations.

A test write may be performed occasionally and/or regularly to calibrate a phase shift provided to a phase shifter module (e.g, provided by one of the phase shifter modules 153, 150', 276 of FIGS. 4, 5 and 7). The terms "occasionally and/or regularly" may refer to performing a test write: subsequent to each power ON event of a HDD system, subsequent to each cycle of a recurring predetermined period; each time a predetermined number of write errors are detected; subsequent to each time a predetermined number of write operations is performed; etc. The phase shift values provided to the phase shift calibration modules may also be updated occasionally and/or regularly.

In FIG. 9, a top view of a zone 350 of BPM with connected bit islands is shown. The zone 350 includes bit islands 352 and grooves 354. The bit islands 352 may be formed of magnetic material and the grooves 354 may be formed of non-magnetic material. The zone 350 includes a test write area 356. Each zone of the BPM may have a dedicated test write area. The test write area 356 may include connected bit islands together to form continuous writable regions 358. A portion 360 of the test write area 356 is shown in FIG. 10.

Referring now also to FIG. 10, a BPM track diagram of the portion 360 of the test write area 356 is shown. The portion 360 includes, for example, tracks$_{1-4}$, where tracks 3 and 4 include the continuous writable regions 358. A slider 370 with a synchronization sensor 372 and a write head 374 may be positioned over the portion of the test write area 356. Arrow 375 indicates direction of the portion 360 relative to the slider 370. The synchronization sensor 372 may be used to detect a bit island pattern of the tracks$_{1-2}$ while the write head 374 may write to the continuous writable regions 358 in tracks$_{3-4}$.

In FIG. 11, a method of calibrating a phase shift value for continuous media and for a phase shifter module and/or a phase error module is shown.

The method includes performing a test write, as provided by tasks 382-388. Although the tasks 382-388 are primarily described with respect to the implementations of FIGS. 4, 5, 7, 9 and 10, the tasks 382-388 may be easily modified to apply to other implementations of the present disclosure. The tasks 382-388 and/or a portion thereof may be iteratively performed. The method may begin at 380.

At 382, a phase shift calibration module (e.g., one of the phase shift calibration modules 205, 205', 303) selects a phase shift value for a current test write. The phase shift value may be: a predetermined value, a random value, a value within a predetermined range, etc.

At 384, a read/write channel module (e.g., the read/write channel module 28 of FIG. 1) and/or a write synchronization module writes a sequence of bits to the BPM in a continuous writable region (e.g., the continuous writable region 358 of FIG. 10) based on the selected phase shift value. A periodic pattern may be written to the continuous writable region using a write clock output signal generated by, for example, one of the synchronization systems of FIGS. 4, 5 and 7. For example, the periodic pattern can be "... ++--++-- ...". At 386, the read head (read/write head) reads the sequence of bits from the BPM.

At 388, the phase shift calibration module may estimate the phase of the read back sequence (read back signal), which gives information about the error in the selected phase shift value used at 382. The phase error is used to correct the selected phase shift value used at 382. The phase of the read back sequence may be compared to a reference read phase value. The reference read phase value may be a calibrated and/or predetermined value. The reference read phase value may represent a correct read phase value and correspond to a correct write phase value. For example, when the phase shift value used at 382 is correct such that the sequence of bits written at 404 are aligned with the bit islands, the error between the phase of the read back signal and the reference read phase value is negligible and/or equal to 0. The phase shift value used at 382 may be adjusted based on the phase error to align bits written in subsequent write events. The method may end at 390.

In the absence of a dedicated test write area and/or continuous writable regions, a test write may be performed on discontinuous bit islands. A pre-defined bit pattern sequence is written to the discontinuous bit islands according to the write clock output signal. The same pre-defined bit pattern sequence is written with different phase shift values. The phase shift value that provides the best performance parameters is selected. This modified method may also be performed occasionally and/or regularly and based on whether there is on-going scheduled read and write operations.

Figure 12:
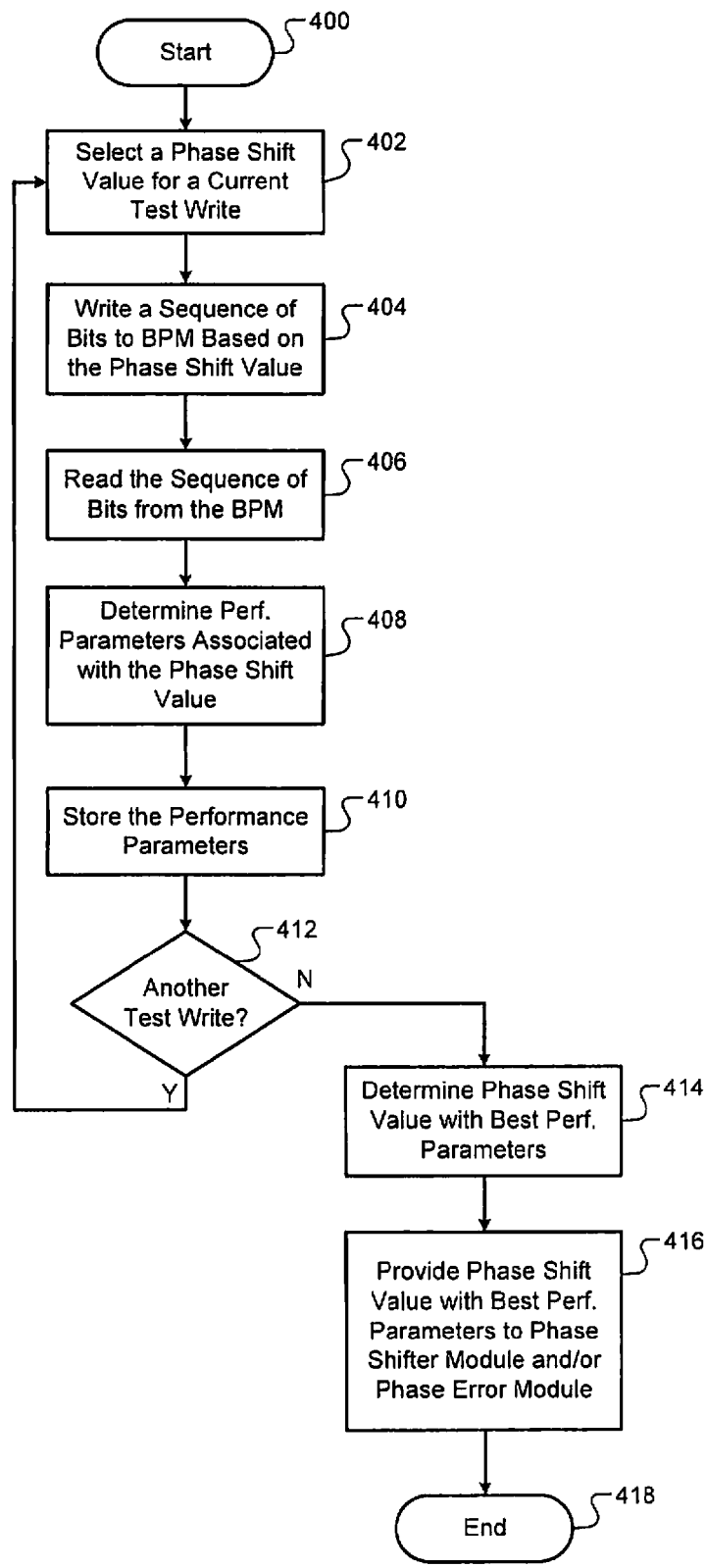
FIG. 12 illustrates a method of calibrating a phase shift value for discontinuous media in accordance with the present disclosure.

In FIG. 12, a method of calibrating a phase shift value for discontinuous (discrete) media and for a phase shifter module and/or a phase error module is shown. The method includes performing a test write, as provided by tasks 402-410. Although the following tasks 402-416 are primarily described with respect to the implementations of FIGS. 4, 5, 7, 9 and 10, the tasks 402-416 may be easily modified to apply to other implementations of the present disclosure. The tasks 402-416 and/or a portion thereof may be iteratively performed. The method may begin at 400.

At 402, a phase shift calibration module (e.g., one of the phase shift calibration modules 205, 205', 303) selects a phase shift value for a current test write. The phase shift value may be: a predetermined value, a random value, a value within a predetermined range.

At 404, a read/write channel module (e.g., the read/write channel module 28 of FIG. 1) and/or a write synchronization module writes a sequence of bits to the BPM in a discontinuous writable region (e.g., area with discrete bit islands) based on the selected phase shift value. A periodic pattern may be written to the discontinuous writable region using a write clock output signal generated by, for example, one of the synchronization systems of FIGS. 4, 5 and 7. For example, the periodic pattern can be "... ++--++-- ...". At 406, the read head (read/write head) reads the sequence of bits from the BPM.

At 408, the phase shift calibration module determines performance parameters (or performance parameter values), such as write phase errors. The phase shift calibration module may estimate the phase of the read back sequence, which gives information about the error in the selected phase shift value. The phase error is used to correct the selected phase shift value. Compare the sequence of bits written to the continuous writable region to the sequence of bits read from the continuous writable region. Each difference between the first and second sequences is a bit error. Write clock phase error may be detected via one of the phase error modules of FIGS. 4, 5 and 7 and provided to the phase shift calibration module. At 410, the phase shift calibration module may store the performance parameters determined at 408 in memory of the phase shift calibration module At 412, the phase shift calibration module determines whether another test write is to be performed. Task 402 is performed when another test write is to be performed, otherwise task 414 is performed.

At 414, the phase shift calibration module determines which one of the phase shift values of the test write(s) performed has the best performance parameters. The phase shift value that provides the best performance parameters is selected. For example the phase shift value that has the smallest associated BER is selected. The performance parameters may be weighted and summed for each phase shift value to determine the phase shift value with the best associated set of performance parameters. At 416, the phase shift calibration module provides the phase shift value with the best performance parameters to a phase shifter module and/or a phase error module (such as one of the modules 150', 153, 274, 276 of FIGS. 4, 5 and 7). This calibrates a phase shift value of a write synchronization system to improve write clock synchronization and minimize errors associated with writing data to and from bit islands.

The above calibration methods of FIGS. 11 and 12 may be performed, for example, when the read/write channel is not performing scheduled read and write operations. A look-up table may be generated based on performed calibrations and stored in memory (e.g., in one of the memories 207, 207', 305 of FIGS. 4, 5 and 7). The look-up table may include calibrated phase shift values for different zones of the BPM. The calibration methods may be repeated occasionally and/or regularly to update the calibrated phase shift values in the look-up table. The phase shift calibration module may provide the stored calibrated phase shift values to, for example, the modules 150', 153, 274, 276 during scheduled read/write operations. The calibration methods may also be performed regularly and prior to each scheduled write operation or prior to a set of write operations.

The above-described tasks of FIGS. 6, 8, 11 and 12 are meant to be illustrative examples; the tasks may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A write clock synchronization system comprising:
    a first module configured to generate a write clock signal;
    a second module configured to, based on a sensor signal received, detect a pattern of bit islands on bit-patterned media, wherein the second module is configured to determine a phase error of the write clock signal based on (i) the pattern of the bit islands, and (ii) a predetermined phase shift value;
    a third module configured to at least one of adjust or select a phase of the write clock signal based on the phase error;
    a fourth module configured to generate the predetermined phase shift value based on a test write; and
    a fifth module configured to write data to the bit islands, wherein during the test write
        the fourth module is configured to select the predetermined phase shift value from a plurality of phase shift values,
        the third module is configured to generate the write clock signal based on the predetermined phase shift value, and
        the fifth module is configured to write the data to the bit islands based on the write clock signal.

2. The write clock synchronization system of claim 1, further comprising a synchronization sensor configured to generate the sensor signal, wherein the synchronization sensor is one of an optical sensor and a magnetic sensor.

3. The write clock synchronization system of claim 2, wherein the synchronization sensor is configured to detect the bit islands while a write head writes data in the bit islands.

4. The write clock synchronization system of claim 1, wherein the second module is configured to determine the phase error based on a phase of the sensor signal.

5. The write clock synchronization system of claim 1, wherein:
    the fourth module is configured to determine at least one performance parameter associated with the predetermined phase shift value; and
    the at least one performance parameter comprises the phase error or a bit error rate.

6. The write clock synchronization system of claim 1, wherein:
    the third module comprises a sixth module; and
    the sixth module is configured to at least one of adjust or select a phase of the write clock signal to generate an interpolated clock signal.

7. The write clock synchronization system of claim 6, wherein:
    the fourth module is configured to perform a plurality of test writes for the plurality of phase shift values;
    the plurality of phase shift values comprise the predetermined phase shift value;
    the fourth module is configured to select, based on performance parameters associated with the plurality of phase shift values, the predetermined phase shift value from the plurality of phase shift values; and
    the second module is configured to determine the phase error based on (i) the sensor signal, and (ii) the predetermined phase shift value.

8. The write clock synchronization system of claim 7, wherein:
    the third module is configured to generate the interpolated clock signal based on (i) the phase error, and (ii) the write clock signal generated by the first module;
    the second module comprises a seventh module configured to, based on the interpolated clock signal, convert the sensor signal to a digital signal; and
    the second module comprises an eighth module configured to determine the phase error based on (i) the digital signal, and (ii) the predetermined phase shift value.

9. The write clock synchronization system of claim 1, further comprising a write head configured to write data on a disk, wherein:
    the third module comprises a sixth module and a seventh module;
    the sixth module is configured to generate an interpolated clock signal based on (i) the phase error, and (ii) the write clock signal generated by the first module;
    the seventh module is configured to frequency convert the interpolated clock signal to a write clock output signal; and
    the write head is configured to write the data on the disk based on the write clock output signal.

10. The write clock synchronization system of claim 1, further comprising a phase lock loop comprising the second module and the third module.

11. The write clock synchronization system of claim 10, wherein:
    the third module is configured to generate an interpolated clock signal based on the phase error;
    the phase lock loop further comprises a sixth module; and
    the sixth module is configured to, based on a calibrated phase shift value, adjust a phase of the interpolated clock signal.

12. The write clock synchronization system of claim 1, wherein:
    the second module is configured to determine timing information of the sensor signal; and
    the third module is configured to synchronize phase and frequency of the write clock signal with the sensor signal.

13. The write clock synchronization system of claim 1, wherein the second module comprises:
    a sixth module configured to filter the sensor signal to generate a filtered sensor signal;
    a seventh module configured to convert the filtered sensor signal from an analog signal to a digital signal; and
    an eighth module configured to determine the phase error based on the digital signal.

14. A write clock synchronization system comprising:
    a first module configured to generate a write clock signal;
    a second module configured to, based on a sensor signal received, detect a pattern of bit islands on bit-patterned media, wherein the second module is configured to determine a phase error of the write clock signal based on (i) the pattern of the bit islands, and (ii) a predetermined phase shift value;

a third module configured to at least one of adjust or select a phase of the write clock signal based on the phase error; and a fourth module configured to generate the predetermined phase shift value based on a test write, wherein:
- the fourth module is configured to perform a plurality of test writes for a plurality of phase shift values, wherein the plurality of phase shift values comprise the predetermined phase shift value,
- the fourth module is configured to, based on performance parameters associated with the plurality of phase shift values, select the predetermined phase shift value from the plurality of phase shift values, and
- the third module is configured to, based on the phase error, synchronize the write clock signal to the bit islands.

15. A write clock synchronization system comprising:

a first module configured to generate a write clock signal;

a second module configured to, based on a sensor signal received, detect a pattern of bit islands on bit-patterned media, wherein the second module is configured to, based on the pattern of the bit islands, determine a phase error of the write clock signal; and a third module configured to, based on the phase error, at least one of adjust or select a phase of the write clock signal, wherein the third module comprises:
- a fourth module configured to generate an equalized signal based on a digital version of the sensor signal,
- a fifth module configured to generate a bit sequence based on the equalized signal,
- a sixth module configured to generate a reconstructed signal based on the bit sequence, and
- a seventh module configured to determine the phase error based on (i) the equalized signal, and (ii) the reconstructed signal.

16. The write clock synchronization system of claim 15, further comprising a magnetic sensor configured to generate the sensor signal.

17. The write clock synchronization system of claim 13, wherein:

the third module comprises a ninth module; and the ninth module is configured to generate an interpolated clock signal based on (i) the phase error, and (ii) the write clock signal generated by the first module.

* * * * *